US007646969B2

(12) United States Patent
Calvet et al.

(10) Patent No.: US 7,646,969 B2
(45) Date of Patent: Jan. 12, 2010

(54) CAMERA SNUBBER ASSEMBLY

(75) Inventors: Robert J. Calvet, Pasadena, CA (US);
Roman C. Gutierrez, Arcadia, CA (US); Kumaraswamy Jayaraj, San Diego, CA (US); Tim Quang-Tinh Ngo, San Diego, CA (US)

(73) Assignee: Siimpel Corporation, Arcadia, CA (US)

( * ) Notice: Subject to any disclaimer, the term of this patent is extended or adjusted under 35 U.S.C. 154(b) by 368 days.

(21) Appl. No.: 11/268,849

(22) Filed: Nov. 8, 2005

(65) Prior Publication Data
US 2006/0193616 A1  Aug. 31, 2006

Related U.S. Application Data

(60) Provisional application No. 60/657,261, filed on Feb. 28, 2005.

(51) Int. Cl.
*G03B 17/00* (2006.01)
*G02B 7/02* (2006.01)
(52) U.S. Cl. ......................... 396/79; 359/823
(58) Field of Classification Search ......... 353/100–101; 310/309; 396/72, 419, 50, 52, 55, 89, 79; 359/823, 824; 108/140, 143; 33/1 M; 348/208.4, 348/208.7, 208.99, 373–376; 74/490.01–490.08; 385/52
See application file for complete search history.

(56) References Cited

U.S. PATENT DOCUMENTS 5,386,294 A * 1/1995 Ototake et al. ............... 356/401
5,699,621 A * 12/1997 Trumper et al. ............... 33/1 M
6,068,801 A * 5/2000 Bodo et al. ................... 264/39
6,850,675 B1 * 2/2005 Calvet et al. .................. 385/52
7,266,272 B1 * 9/2007 Calvet et al. .................. 385/52
2001/0004420 A1 * 6/2001 Kuwana et al. ............... 396/55
2002/0125789 A1 * 9/2002 Brandt ....................... 310/309
2003/0048036 A1 * 3/2003 Lemkin ...................... 310/309
2003/0086751 A1 * 5/2003 Culpepper ................... 403/52
2004/0066494 A1 * 4/2004 Lee et al. ...................... 353/31
2005/0148433 A1 * 7/2005 Wang et al. ................... 482/27
2005/0249487 A1 * 11/2005 Gutierrez ..................... 396/85
2006/0192858 A1 * 8/2006 Calvet ..................... 348/208.7

* cited by examiner

*Primary Examiner*—W. B. Perkey
*Assistant Examiner*—Minh Q Phan
(74) *Attorney, Agent, or Firm*—Haynes and Boone, LLP (57) ABSTRACT

A method and system for limiting the motion of components such as the optics of a camera are disclosed. The system can comprise a stage and a snubber assembly for controlling motion of the stage in six degrees of freedom. For example, the snubber assembly can permit movement in one translational degree of freedom while substantially limiting motion in the other five degrees of motion so as to facilitate focusing and/or zooming of a camera while inhibiting misalignment of the optics and while providing some protection against shock and vibration. Such motion control can be achieved while mitigating costs associated with precision manufacturing of the snubber assembly.

26 Claims, 6 Drawing Sheets

CAMERA SNUBBER ASSEMBLY

PRIORITY CLAIM

This patent application claims the benefit of the priority date of U.S. provisional patent application Ser. No. 60/657,261, filed on Feb. 28, 2005 and entitled AUTOFOCUS CAMERA pursuant to 35 USC 119. The entire contents of this provisional patent application are hereby expressly incorporated by reference.

TECHNICAL FIELD

The present invention relates generally to cameras. The present invention relates more particularly to a snubber assembly for limiting the motion of optical elements in a miniature camera, such as a miniature camera that is suitable for use in a cellular telephone.

BACKGROUND

Miniature cameras are well known. Miniature cameras are widely used in contemporary cellular telephones. They are also used in other devices, such as laptop computers and personal digital assistants (PDAs). Miniature cameras can even be used as stand alone devices for such applications as security and surveillance.

Contemporary miniature cameras, such as those used in cellular telephones, are fixed focus cameras. That is, the focus of the cameras is preset. The camera has a small enough aperture so as to provide sufficient depth of field such that focus is generally acceptable over a wide range of distances. However, such stopping down of the camera severely limits it's use in low light conditions.

Stopping down also limits resolution since it tends to inhibit the use of higher pixel count imagers. As those skilled in the art will appreciate, larger apertures allow higher imager pixel counts, but require the use of variable focus.

Variable focus necessitates the use of movable optics. However, movable optics suffer from inherent disadvantages. Foremost among these disadvantages is the size of the mechanisms required to effect and control movement of the movable optics. For example, the structures used to control the movement of optics in larger cameras are simply too large for use in many miniature cameras. As such, it is desirable to provide miniature structures for controlling motion in miniature cameras.

BRIEF SUMMARY

A method and system for controlling, i.e., limiting, the motion of miniature components, such as the optics of a camera, are disclosed. The system can comprise a stage and a snubber assembly for controlling the motion of the stage in six degrees of freedom. Camera optics can be attached to the stage to facilitate focusing and/or zooming. According to one embodiment of the present invention, the stage can move freely in one degree of freedom within a limited range of motion. Thus, the movement of the stage can be used for moving optics so as to effect focus and/or zoom, for example.

For example, the snubber assembly can readily permit movement in one translational degree of freedom while substantially limiting motion in the other five degrees of freedom. This is accomplished in a manner that facilitates focusing and/or zooming of a camera while inhibiting misalignment of the optics and while also providing some protection against shock and vibration.

Such motion control can be achieved while mitigating the costs associated with precision manufacturing of the snubber assembly. More particularly, the precision with which manufacturing of the snubber assembly is performed can be reduced by relying upon physical features of a stage assembly to facilitate precise positioning of physical features of the snubber assembly. That is, positioning of at least some features of the snubber assembly are dependent upon corresponding features of the stage assembly such that desirable alignment of the snubber assembly with respect to the stage assembly results.

According to one embodiment of the present invention, mesas of the snubber assembly abut stationary or fixed portions of the stage assembly so as to define, at least in part, one or more horizontal gaps between the stage and the snubber assembly. The size of these horizontal gaps determines the limits of horizontal movement of the stage.

Similarly, shims of the snubber assembly abut the fixed portion of the stage assembly so as to define, at least in part, one or more vertical gaps between the stage and the snubber assembly. The size of these vertical gaps determines the limits of vertical movement of the stage.

Undesirable rotations of the stages can also be limited by the snubber assembly of the present invention. Pitching motion (rotation about the horizontal or lateral axis, which is orthogonal to the direction of travel) results in up and down vertical motion of the front and back ends of the stage. Similarly, yaw motion (rotation about a vertical axis) results in horizontal or lateral motion of the front and back ends of the stage. Similarly, roll motion (rotation about an axis along the direction of travel) results in vertical motion of the sides of the stage. Since the snubber assembly inhibits vertical motion of the front and back ends of the stage, lateral motion of the front and back ends of the stage, and vertical motion of the sides of the stage, these three rotations are substantially inhibited.

According to one aspect of the present invention, smaller features of the snubber assembly are manufactured with higher tolerances, while larger features of the snubber assembly can be manufactured with lower tolerances. It is not necessary to manufacture larger features of the snubber assembly with higher tolerances and thus manufacturing costs are therefore substantially reduced.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

A method and system for defining the motion of a stage is disclosed. The stage is suitable for mounting camera optics upon. For example, focus and/or zoom lenses can be mounted to the stage. According to one aspect of the present invention, motion of the stage in six degrees of freedom is controlled. More particularly, motion in five degrees of freedom is substantially limited, while motion in one translational degree is freedom is facilitated. For example, translational motion in two degrees of freedom can be limited to approximately 10 microns, rotational motion in three degrees of freedom can be limited to approximately 0.1 degrees, and translational motion in one degree of freedom in excess of one millimeter can be facilitated.

In this manner, the stage can be permitted to translate along one axis sufficiently so as to effect focusing and/or zooming, while not being permitted to translate sufficiently along other axes or to rotate about any axis sufficiently so as to effect misalignment of the optics to a degree that would substantially degrade performance of the camera. Moreover, the snubber assembly of the present invention can be configured so as to only effect motion control when the stage is caused to move outside of a set of predefined ranges. That is, the snubber assembly can be configured such that it has no effect until the stage experiences a shock or abnormal operation that would otherwise cause it to move in an undesirable manner. When this happens, the snubber assembly can then restrict motion of the stage to within the desired ranges, so as to prevent the misalignment of optics, for example. Thus, during normal operation, the snubber assembly can have little or no effect.

One way to make a snubber assembly that limits movement of a stage is to use close (precise) tolerances to assure that all features of the snubber assembly are properly located. However, such construction of the snubber assembly requires that the comparatively large structures thereof be manufactured with the same close tolerances as the comparatively small structures. As those skilled in the art will appreciate, while it is comparatively easy to manufacture smaller structures with such close tolerances, it becomes increasingly difficult to do so as the size of the structures increases. That is, deviations from desired dimensions tend to accumulate across larger distances, making it difficult to maintain close tolerances. According to one aspect of the present invention, a different approach results in a snubber that precisely limits the motion of a stage.

According to one aspect of the present invention, critical gap dimensions are obtained by manufacturing only selected small structures of the snubber assembly with comparatively higher precision, while manufacturing the rest (particularly the larger dimensions) of the snubber assembly with substantially lower precision. Because the larger dimensions are manufactured with lower precision, the positions of the smaller structures of the snubber assembly are not precise.

This lack of precision in the location of the smaller structures can be compensated for by using portions of the stage assembly to precisely position the smaller structures. That is, the smaller structures of the snubber assembly are effectively keyed into position using precisely formed portions of the stage assembly. Thus, the position of snubbers manufactured, at least in part, with a comparatively low amount of precision is determined by a portion of a stage assembly that is manufactured with a comparatively high amount of precision.

Figure 1:
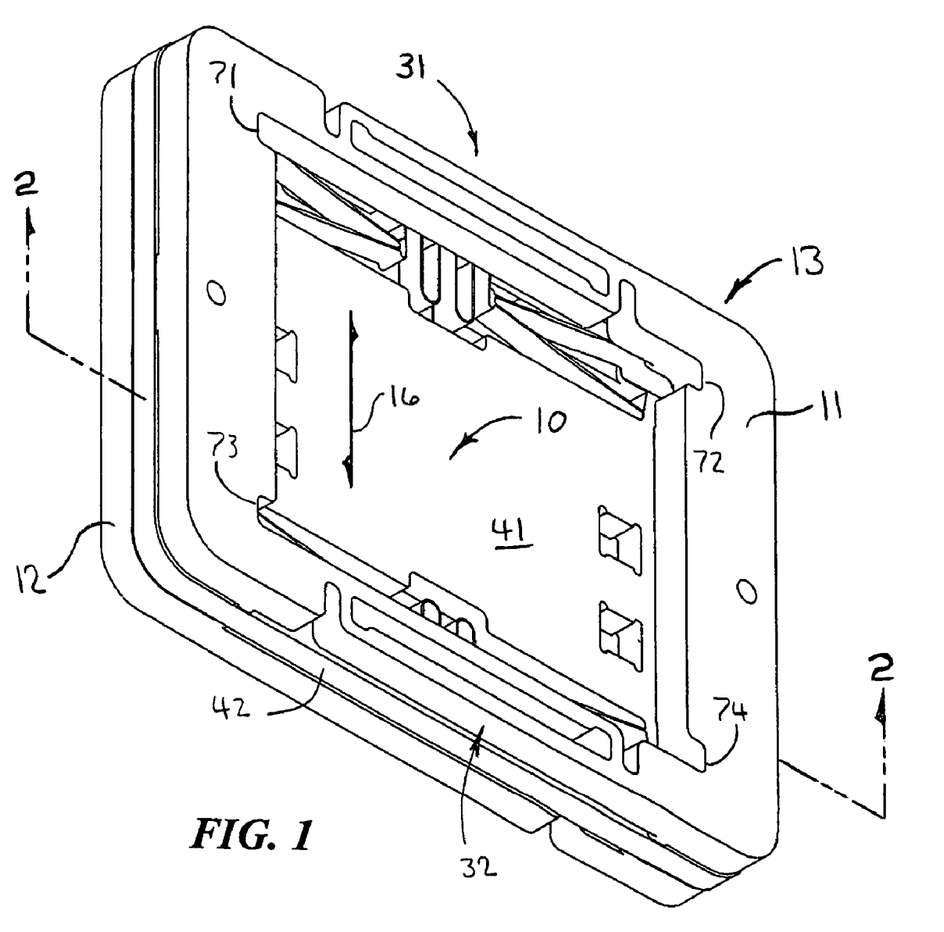
FIG. 1 is perspective top view of a stage and snubber assembly according to an exemplary embodiment of the present invention.
Figure 2:
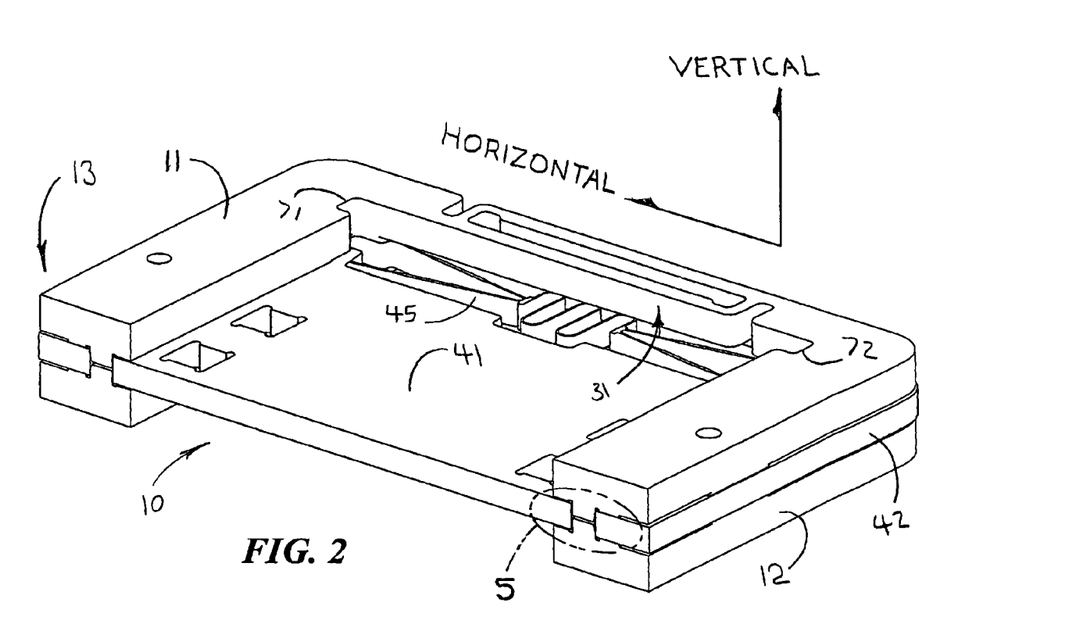
FIG. 2 is a top perspective cross-sectional view of the stage and snubber assembly taken along line 2 of FIG. 1.

Referring now to FIGS. 1 and 2, a stage assembly 10 (better shown in FIG. 5) is sandwiched between two portions, 11 and 12 (better shown in FIGS. 3 and 4), of a snubber assembly 13, according to one embodiment of the present invention. The stage assembly 10 and the snubber assembly 13 can be generally planar structures, formed from silicon, for instance. Stage assembly 10 and/or snubber assembly 13 can alternatively be formed from another material, such as plastic or metal. Alternatively, both the stage assembly 10 and the snubber assembly 13 can be formed from either plastic or silicon or any other desired material or combination of materials.

Figure 5:
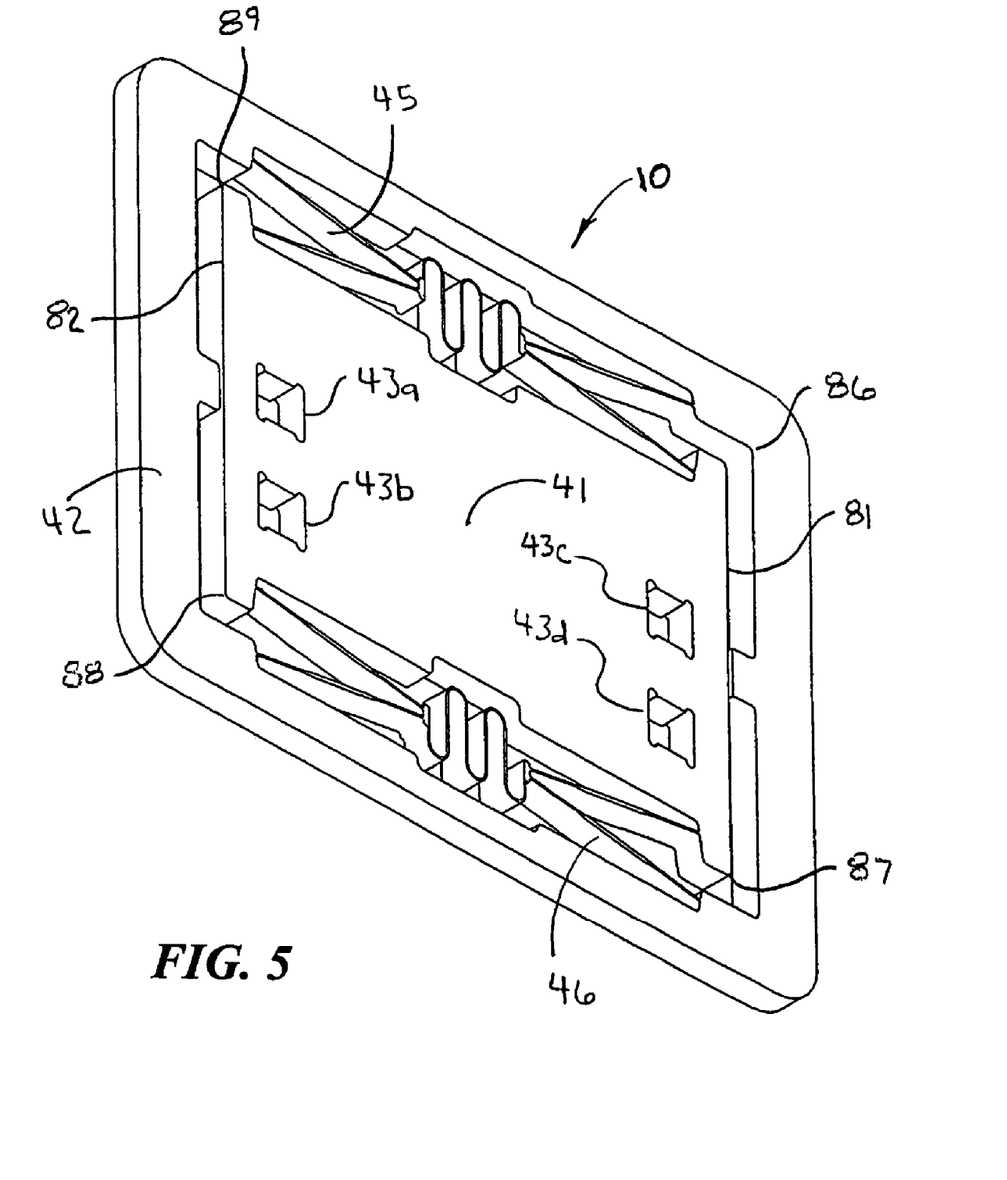
FIG. 5 is a top or bottom (both are identical) perspective view of the stage assembly of FIG. 1.

Stage assembly 10 comprises a stage 41 that moves back-and-forth, so as to facilitate movement of optics for focusing and/or zooming, for example. Stage assembly 10 further comprises a frame 42 that generally surrounds stage 41 (as best seen in FIG. 5). Frame 42 is fixed in position with respect to snubber assembly 13 and thus does not move. Arrow 16 shows the back-and-forth directions of motion of stage 41 with respect to frame 42 (better shown in FIG. 5) and with respect to snubber assembly 13. Snubber assembly 13 facilitates such back-and-forth motion of stage 41 while substantially inhibiting all other motions of stage 41.

Figure 3:
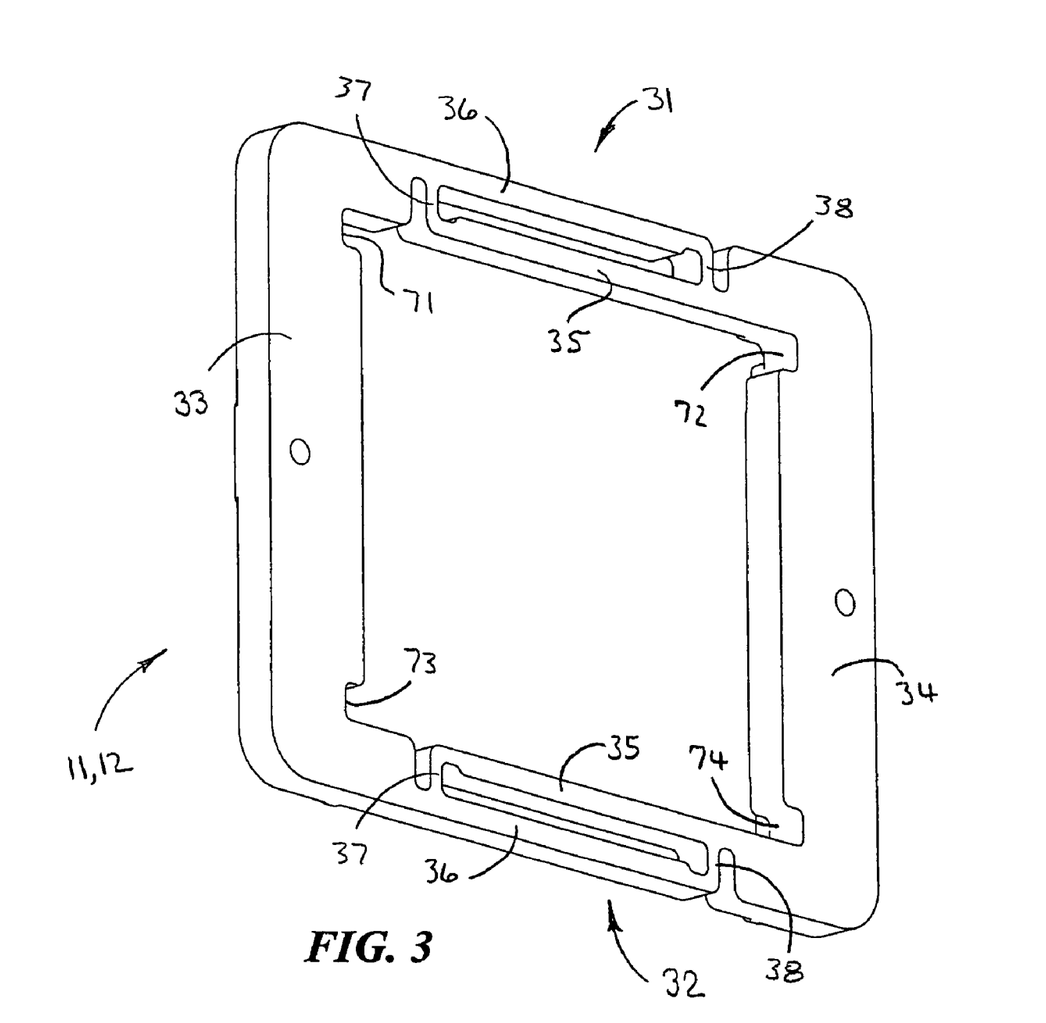
FIG. 3 is an outboard perspective view of a snubber portion of FIG. 1.
Figure 4:
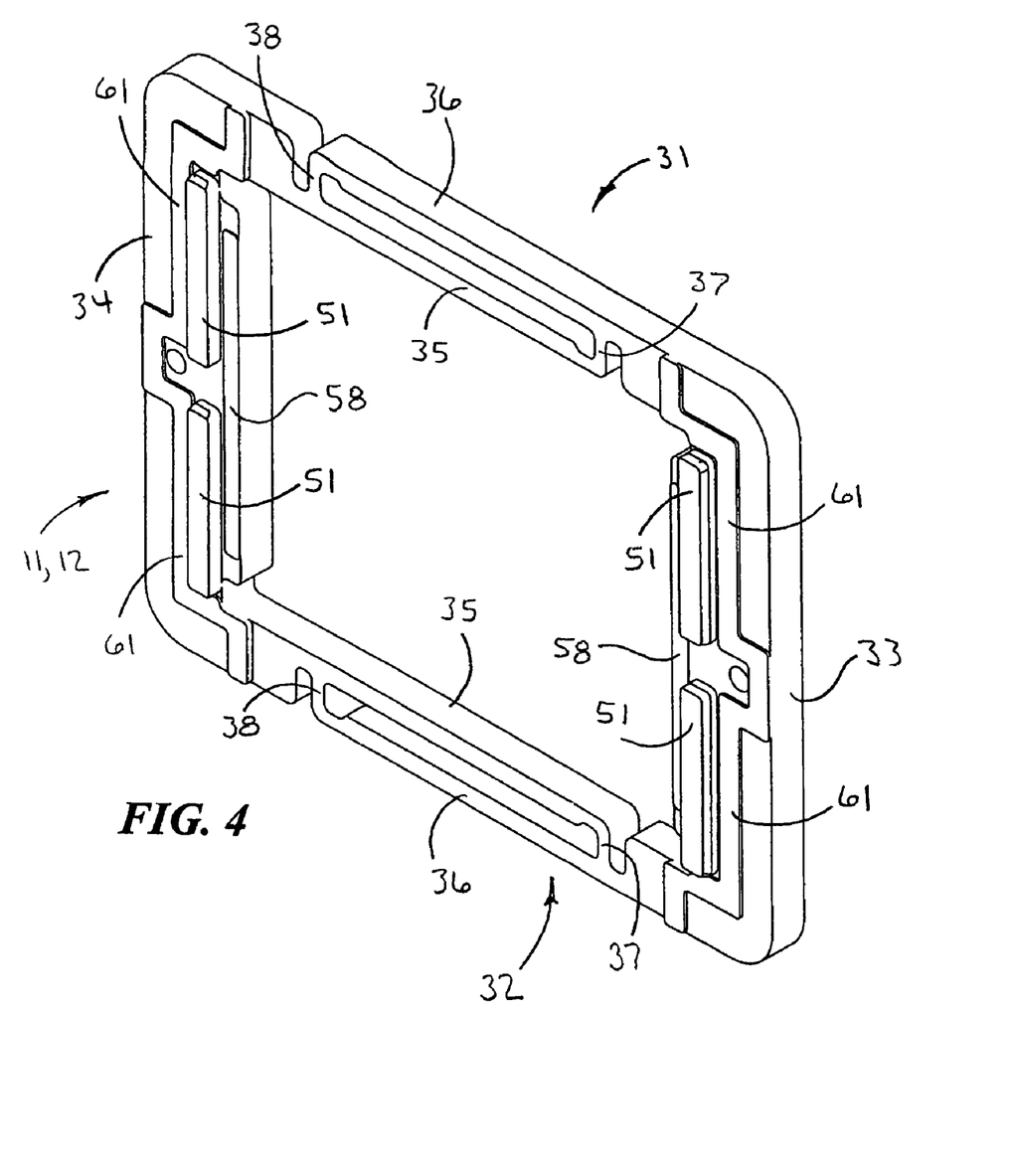
FIG. 4 is an inboard perspective view of the snubber portion of FIG. 3.
Figure 6:
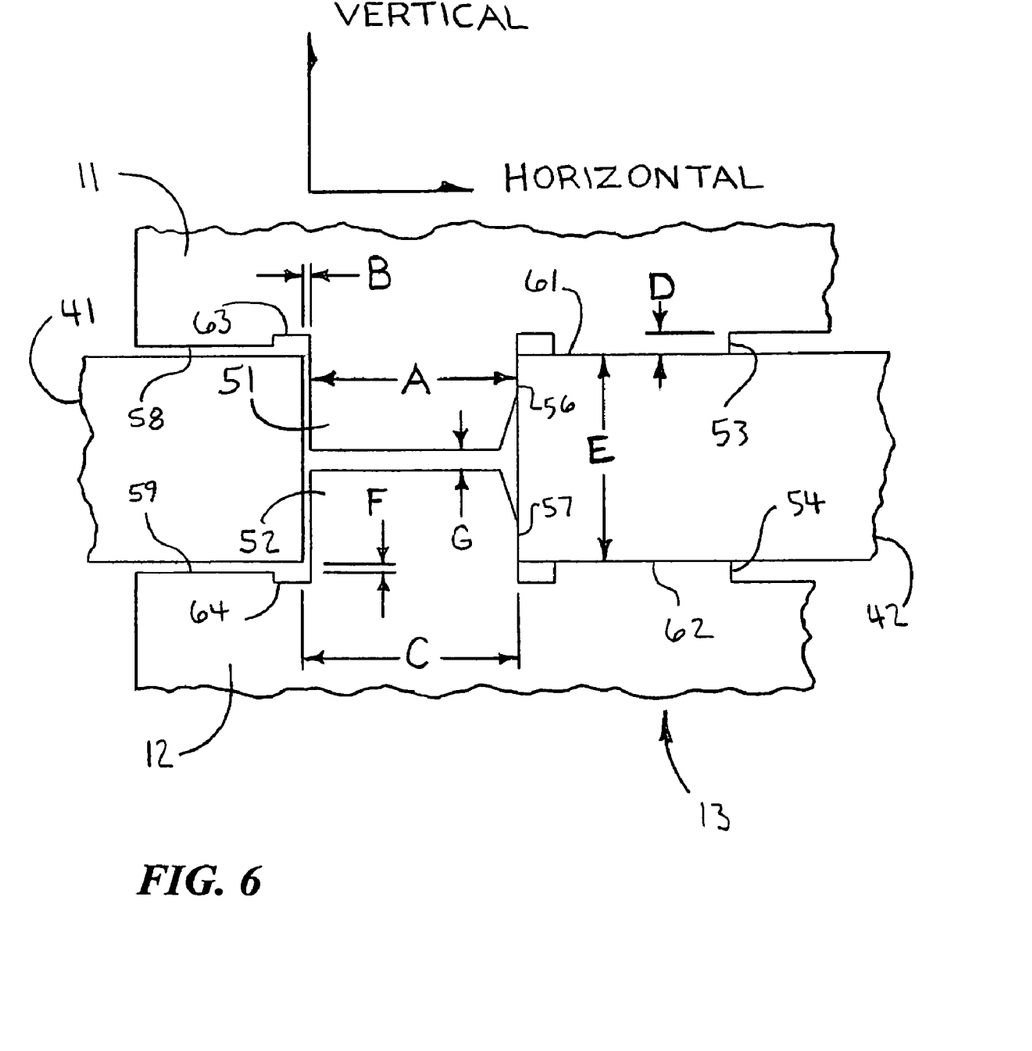
FIG. 6 is an enlarged fragmentary view of the interface of the top snubber, the bottom snubber, and the stage, taken within line 5 of FIG. 2.

Referring now to FIGS. 3 and 4, each portion 11, 12 of snubber assembly 13 can be a generally planar and generally rectangular structure. Snubber assembly 13 can comprise two biasing members 31 and 32 that function as springs to bias two sides 33 and 34 outwardly, so as to cause them to contact portions (surfaces 56 and 57 as shown in FIG. 6) of frame 42 in a manner that advantageously positions critical features of snubber assembly 13, as discussed in detail below. Alternatively, the inherent resiliency of snubber assembly 13 can effect such biasing.

Each biasing member 31, 32 can comprise an inboard member 35, an outboard member 36, and two side members 37 and 38 that are configure to cooperate so as to provide spring tension that moves the sides 33 and 34 outwardly after sides 33, 34 have been pushed inwardly (such as when stage assembly 10 is being installed therebetween). That is, the rectangle defined by an inboard member 35, an outboard member 36, and two side members 37 and 38 can deform so as to define a parallelogram that provides spring tension. Each portion 11, 12 of snubber assembly 13 further comprises structural features that cooperate with stage assembly 10 to define tolerances or spacings between snubber assembly 13 and stage 41, as discussed in detail with reference to FIG. 6 below.

With particular reference to FIG. 4, each portion 11, 12 of snubber assembly 13 may have formed upon an inboard (snubber assembly 10 contacting) surface thereof a plurality of mesas 51, shims 61, and stops 58, the functions of which are discussed in detail with reference to FIG. 6 below. Although mesas are shown formed upon both of the snubber assemblies, mesas may alternatively be formed upon only one of the snubber assemblies. Mesas can be formed upon both snubber assemblies so as to maintain symmetry (so as to allow a single part to be capable of being used as either an upper snubber or a lower snubber. However, such symmetry is not a requirement. Therefore, a single mesa (which will generally have approximately twice the height of the mesas shown in FIG. 4) can replace each complimentary pair of mesas.

Referring now to FIG. 5, stage assembly 10 comprises a movable portion or stage 41 and a fixed portion or frame 42. Stage 41 can be a generally planar, generally rectangular structure. Optics are attachable, either directly or indirectly, to stage 41.

Stage 41 can move in response to a motor or actuator, such as to effect focusing and/or zooming. For example, an optics assembly (not shown) can be attached to stage 41 via apertures 43a-43d.

Frame 42 can similarly be a generally planar and generally rectangular structure that can substantially surround a periphery of stage 41. Frame 42 can be movably attached to stage 41 via flexure assemblies 45 and 46. Flexure assemblies 45 and 46 can preferentially facilitate movement of stage 41 in one desired translational degree of freedom, i.e., in the back-and-forth directions of arrow 16 of FIG. 1. Snubber assembly 13 can limit movement of stage 41 that is beyond the one desired translation degree of freedom.

Stage 41, as well as frame 42, snubber assembly 13, and other components of the present invention, can be of any desired shape and/or configuration. Stage assembly 10 can be formed monolithicly, such as via the etching or milling of a single piece of silicon or other material. Similarly, snubber assembly 13 can also be formed monolithicly. Alternatively, stage assembly 10 and/or snubber assembly 13 can be formed in any other desired manner using any desired material. Indeed, the reduced precision needed by snubber assembly 13 according to one aspect of the present invention allows snubber assembly 13 to be formed of plastic using low a precision manufacturing process.

Snubber assembly 13 defines limits to movement of stage 41, so as to inhibit movement in five other degrees of freedom for which it is desirable to restrict movement of stage 41. Such limitations on the movement of stage 41 tend to maintain desired alignment of components, such as optics. The limitations are also desirable, for example, in the event of shock or vibration that would other cause stage 41 to move in a manner that may cause damage to itself or other components, e.g., lenses of a camera. Thus, the stage, and consequently the camera optics, can be permitted to move in a manner that facilitates desired functionality, e.g., focusing and/or zooming, while also being restrained in a manner that mitigates undesirable malfunctioning (misalignment of optics) and damage.

Referring now to FIG. 6, exemplary structures of stage assembly 10 and snubber assembly 13 that limit motion of stage 41 in five degrees of freedom while facilitating substantially more motion in a sixth degree of freedom (as indicated by arrow 16 in FIG. 1) are shown. Each portion 11, 12 of snubber assembly 13 comprises features such as mesas 51, 52, shims 53, 54, and stops 58, 59 that define limits to the movement of stage 41 in five degrees of freedom while permitting unrestricted movement of stage 41 in one degree of freedom.

Mesas 51, 52, shims 53, 54, and stops 58, 59 are formed precisely. They are also precisely positioned by keying to or abutting precisely formed portions of frame 42, so that they are, in-turn, precisely positioned themselves and are thus suitable for defining limits to the movement of stage 41.

In this manner, the limits to the movement of stage 41 can be defined with greater precision than the precision with which the overall snubber assembly 13 is manufactured because the snubber assembly 13 cooperates with the frame 42 of the stage assembly 10 to define positioning of the structures that limit motion of stage 41 and because frame 42 is manufactured with sufficient precision so as to facilitate such definition of these positions.

More particularly, the width, Dimension A, of each mesa 51, 52 together with the distance between stage 41 and frame 42, Dimension C, defines the size of the horizontal gap, Dimension B, between stage 41 and snubber assembly 13. Since the width of each mesa 51, 52, Dimension A, and the distance between the stage 41 and the frame 42, Dimension C, can be easily controlled, the horizontal gap, Dimension B, can likewise be easily controlled. The distance between the stage 41 and frame 42, Dimension C, is controlled by precisely manufacturing the overall dimensions of stage assembly 10. The width of mesa 51, 52 only requires precision in the manufacturing of a comparatively small portion of the snubber assembly 13, i.e., each mesa 51, 52 itself. It does not require that the position of each mesa 51, 52 be precisely determined during manufacturing of snubber assembly 13.

Positioning of each mesa 51, 52 is determined by its contact with frame 42 at surfaces 56 and 57. Contact at surfaces 56 and 57 is effected by the outward biasing of side members 33 and 34 of each portion 11, 12 of snubber assembly, as described above. Since frame 42 of snubber assembly 13 is manufactured with precision, this contact point is precisely located. Thus, the size of the horizontal gap, Dimension B, between the stage 41 and the snubber assembly 13 can be controlled without requiring that the overall manufacturing tolerances of snubber assembly 13 be precise.

Similarly, the thickness, Dimension D, of each shim 53, 54 together with the thickness, Dimension E, of frame 42, defines the size of each horizontal gap, such as Dimension F, between stage 41 and the stops 58, 59 of snubber assembly 13. Shims 53, 54 contact frame 42 at surfaces 61, 62 thereof. This contact is effected by attachment of the upper portion 11 to the lower portion 12 of snubber assembly 13 by any desired means, such as by adhesive bonding. Upper portion 11 and lower portion 12 can be attached to one another directly, or can be attached to one another indirectly, such as by adhesively bonding upper portion 11 and lower portion 12 to stage 41 or by using detents or the like to attach upper portion 11 and lower portion 12 to stage 41.

There are two such vertical gaps on each of the two sides of stage 41. On each side of stage 41, one vertical gap is above stage 41 and one vertical gap is below stage 41. Since the thickness, Dimension D, of each shim 53, 54, and the thickness, Dimension E, of frame 42 can be precisely controlled, each vertical gap, Dimension F, can also be precisely controlled. The thickness, Dimension D, of each shim can be controlled by precisely manufacturing a small portion of the snubber assembly 13. The thickness, Dimension E, of frame 42 can be precisely controlled during manufacture thereof. As with the horizontal gap, Dimension B, the distance between stage 41 and frame 42 defining each one of the vertical gaps, such as Dimension F, is controlled by precisely manufacturing the overall dimensions of stage assembly 10. The thickness, Dimension D, of shims 53, 54 only requires precision in the manufacturing of a comparatively small portion of snubber assembly 13, i.e., each shim 53, 54 itself. Again, it does not require that the position of each shim 53,54 be precisely determined during manufacturing of snubber assembly 13.

It is worthwhile to note that a vertical gap, Dimension G, is provided between mesas 51 and 52 to insure that they do not contact one another and thereby interfere with proper positioning of shims 53 and 54 (and consequently with the definition of the vertical gaps between stage 41 and snubber assembly 13, such as Dimension F). The size of the vertical gap, Dimension G, is not crucial.

For example, Dimension A can be approximately 300 microns, Dimension B can be approximately 10 microns, Dimension C can be approximately 310 microns, Dimension D can be approximately 25 microns, Dimension E can be approximately 300 microns, Dimension F can be approximately 10 microns, and Dimension G can be approximately 25 microns. However, as those skilled in the art will appreciate, various other values for these dimensions are likewise suitable and the dimensions used will depend upon the specific application.

Thus, only the mesas 51, 52, shims 53, 54 and stops 58, 59 of snubber assembly 13 need be precisely manufactured.

These are comparatively small portions of snubber assembly 13 and can thus be precisely manufactured with relative ease. The overall dimensions of snubber assembly 13 do not require such precision. Moreover, according to one aspect of the present invention, close tolerances (Dimensions B and F, for example) between the stage 41 and the snubber assembly 13 are obtained without requiring that the larger dimensions of snubber assembly be precisely controlled.

Rather, the larger dimensions of stage assembly 10 are controlled, as well as the smaller dimensions of critical structures of snubber assembly 13 that cooperate with stage assembly 10 to determine the dimensions of critical gaps therebetween (such as Dimensions B and F). In this manner, the manufacturing process of the stage and snubber assembly of the present invention is simplified and the cost thereof is mitigated.

Optionally, channels 63 and 64 are formed in upper 11 and lower 12 portions of snubber assembly 13. Channels 63 and 64 mitigate the likelihood of edges 81 and 82 (FIG. 5) of stage 41 contacting upper 11 and lower 12 portions of snubber assembly 13 and causing damage to stage 41 and/or snubber assembly 13.

Similarly, cutouts 71-74 (best shown in FIG. 3) can be formed in upper 11 and lower 12 portions of snubber assembly 13 to inhibit corners 86-89 (FIG. 5) from contacting upper 11 and lower 12 portions of snubber assembly 13 and causing damage to stage 41 and/or snubber assembly 13.

In operation, stage 41 can move substantially in one translational degree of freedom, as indicated by arrow 16 of FIG. 1. For example, optics mounted to stage 41 can be moved in these directions to effect focusing and/or zooming of a camera. Such movement of stage 41 results in compression of one set of flexures (such as flexures 45 of FIG. 5), while simultaneously resulting in expansion of the other set of flexures (such as flexures 46 of FIG. 5). The amount of movement along this one degree of freedom is limited by the configuration of flexures 45, 46 and by the size of frame 42, not by snubber assembly 13.

It is also worthwhile to note that the stage and snubber assembly of the present invention can be configured such that during normal operation stage 41 does not contact snubber assembly 13. Thus, the snubbing action that can be provided by mesas 51, 52 and stops 58, 59 can be for extraordinary circumstances, such as when the device is accidentally dropped. However, in such extraordinary circumstances, the snubber assembly of the present invention can prevent excessive motion in any combination of degrees of freedom.

Movement in the five restricted degrees of freedom is comparatively limited. Translation of stage 41 from side-to-side (toward and away from mesas 51, 52) is limited by mesas 51, 52. That is, when stage 41 moves from side-to-side by an amount greater than Dimension B, it contacts mesas 51, 52, which restrict its motion. Translation of stage 41 up and down (toward and away from stops 58, 59) is similarly limited by stops 58, 59. All rotations of stage 41 are limited by either mesas 51, 52 or stops 58, 59.

More particularly, undesirable pitching motion (rotation about the horizontal or lateral axis, which is orthogonal to the direction of travel) results in up and down vertical motion of the front and back ends of the stage that is limited by stops 58. Similarly, yaw motion (rotation about a vertical axis) results in horizontal or lateral motion of the front and back ends of the stage that is limited by mesas 51. Similarly, roll motion (rotation about an axis along the direction of travel) results in vertical motion of the sides of the stage that is limited by stops 58. Since snubber assembly 13 inhibits vertical motion of the front and back ends of stage 41, lateral motion of the front and back ends of the stage 41, and vertical motion of the sides of the stage 41, these three rotations, i.e., pitch, roll, and yaw, are substantially inhibited.

Thus, according to at least one aspect of the present invention, motion control is provided for camera optics or the like wherein limits on the movement of the optics are defined by a snubber assembly that can be manufactured, at least in part, using comparatively low precision techniques. This is because features of fixed portion or frame 42 of stage assembly 10 are used to align motion limiting features (such as mesas 51, 52 and stops 58, 59) of snubber assembly 13. In this manner, the cost of manufacturing the stage and snubber assembly is substantially mitigated.

Although the snubber assembly is described herein as being suitable for controlling the motion of a stage that supports the optics of a camera, those skilled in the art will appreciate that the stage can similarly be used to support other items. For example, the stage can alternatively be used to position a specimen for viewing under a microscope or for other analysis. Thus, discussing the invention herein as being useful for positioning the optics of a camera is by way of example only, and not by way of limitation.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A stage and snubber assembly for defining motion of optics, the stage and snubber assembly comprising:
   a stage assembly to which the optics are attachable; and,
   a snubber assembly configured to limit the amount of motion of the stage in five degrees of freedom while facilitating a substantially greater amount of motion in a sixth degree of freedom,
   wherein the stage assembly comprises a movable portion and a fixed portion, a gap between the snubber assembly and the movable portion of the stage assembly being defined by abutting structures of the snubber assembly and the fixed portion of the stage assembly.

2. The stage and snubber assembly as recited in claim 1, wherein the stage assembly is generally planar.

3. The stage and snubber assembly as recited in claim 1, wherein:
   the fixed portion is attached to the snubber assembly; and
   the movable portion is attached to the optics.

4. The stage and snubber assembly as recited in claim 3, further comprising:
   flexures attaching the movable portion to the fixed portion.

5. The stage and snubber assembly as recited in claim 1, wherein the snubber assembly comprises two generally planar portions.

6. The stage and snubber assembly as recited in claim 1, wherein the snubber assembly comprises two generally planar portions that are attached to one another.

7. The stage and snubber assembly as recited in claim 1, wherein the snubber assembly comprises two generally planar portions that are attached to one another via adhesive bonding.

8. The stage and snubber assembly as recited in claim 1, wherein the snubber assembly comprises two generally planar portions that are attached to one another via adhesive bonding to the stage.

9. The stage and snubber assembly as recited in claim 1, wherein the snubber assembly is attached to the stage via adhesive bonding.

10. The stage and snubber assembly as recited in claim 1, wherein the snubber assembly comprises two generally planar portions that are attached to one another via detents.

11. The stage and snubber assembly as recited in claim 1, wherein the snubber assembly comprises a frame that generally surrounds a periphery of a moving portion of the stage assembly.

12. The stage and snubber assembly as recited in claim 1, wherein the snubber assembly comprises two generally planar portions that are attached to one another so as to capture the stage assembly between the two portions.

13. The stage and snubber assembly as recited in claim 1, wherein the snubber assembly comprises two generally planar portions that are attached to one another so as to capture the stage assembly between the two portions in a manner that facilitates construction of the snubber using comparatively lower precision while providing comparatively higher precision of gaps between the snubber assembly and the stage assembly.

14. The stage and snubber assembly as recited in claim 1, wherein:
   horizontal movement of the movable portion of the stage is limited to approximately 10 microns in each of two opposite directions; and,
   vertical movement of the movable portion of the stage is limited to approximately 10 microns in each of two opposite directions.

15. The stage and snubber assembly as recited in claim 1, wherein the snubber assembly is manufactured with comparatively low precision and the fixed portion of the stage assembly is manufactured with comparatively high precision.

16. The stage and snubber assembly as recited in claim 1, wherein larger dimensions of the snubber assembly are manufactured to a precision of approximately 10 microns,
   mesas, shims and stops of the snubber assembly are manufactured to a precision of approximately 2 microns, and
   the fixed portion of the stage assembly is manufactured to a precision of approximately 1 micron.

17. The stage and snubber assembly as recited in claim 1, further comprising a channel formed in the snubber assembly so as to inhibit a corner of the movable portion of the stage assembly from contacting the snubber assembly.

18. The stage and snubber assembly as recited in claim 1, wherein the stage assembly and the snubber assembly are arranged in a personal electronic device.

19. The stage and snubber assembly as recited in claim 1, wherein the stage assembly and the snubber assembly are arranged in a personal electronic device selected from the group consisting of:
   a portable computer;
   a laptop computer;
   a notebook computer;
   a pocket personal computer (pocket PC);
   a personal digital assistant (PDA); and,
   a cellular telephone.

20. A camera, comprising:
   the stage and snubber assembly as recited in claim 1; and,
   optics attached to the moveable portion of the stage assembly.

21. A cellular telephone comprising the camera of claim 20.

22. A camera, comprising:
   a stage assembly to which optics are attached;
   means for defining motion of the stage in six degrees of freedom, wherein overall dimensions of the means are manufactured with substantially less precision than smaller, gap defining structures of the means; and
   wherein the stage assembly comprises a movable portion and a fixed portion, a gap between the means for defining motion and the movable portion of the stage assembly being defined by abutting structures of the means for defining motion and the fixed portion of the stage assembly.

23. A cellular telephone comprising a camera, the camera comprising:
   a stage assembly to which the optics are attached;
   means for defining motion of the stage in six degrees of freedom, wherein overall dimensions of the means are manufactured with substantially less precision than smaller, gap defining structures of the means; and
   wherein the stage assembly comprises a movable portion and a fixed portion, a gap between the means for defining motion and the movable portion of the stage assembly being defined by abutting structures of the means for defining motion and the fixed portion of the stage assembly.

24. A method for controlling motion, the method comprising:
   forming a stage assembly to a comparatively higher degree of precision;
   forming larger features of a snubber assembly to a comparatively lower degree of precision;
   forming smaller features of the snubber assembly to a comparatively higher degree of precision; and
   wherein the stage assembly comprises a movable portion and a fixed portion, a gap between the snubber assembly and the movable portion of the stage assembly being defined by abutting structures of the snubber assembly and the fixed portion of the stage assembly.

25. A method for substantially restricting motion of a stage assembly in five degrees of freedom while facilitating a substantially greater amount of motion of the stage in a sixth degree of freedom, the method comprising:
   capturing the stage assembly within a snubber assembly;
   using features of a fixed portion of the stage assembly to align motion limiting features of the snubber assembly; and
   wherein the stage assembly comprises a movable portion and a fixed portion, a gap between the snubber assembly and the movable portion of the stage assembly being defined by abutting structures of the snubber assembly and the fixed portion of the stage assembly.

26. A method for making a stage and snubber assembly, the method comprising:
   forming a stage assembly;
   forming a snubber assembly for the stage, the snubber assembly having larger dimensions thereof and having gap defining features thereof;
   using comparatively lower precision for the larger dimensions and using comparatively higher precision for the gap defining features; and
   wherein the stage assembly comprises a movable portion and a fixed portion, a gap between the snubber assembly and the movable portion of the stage assembly being defined by abutting structures of the snubber assembly and the fixed portion of the stage assembly.

* * * * *